May 13, 1941.  M. BIRKIGT  2,242,170

MACHINE TOOL

Filed Dec. 28, 1938  4 Sheets-Sheet 1

Inventor:
Marc Birkigt,
Bailey & Carson
Attorneys

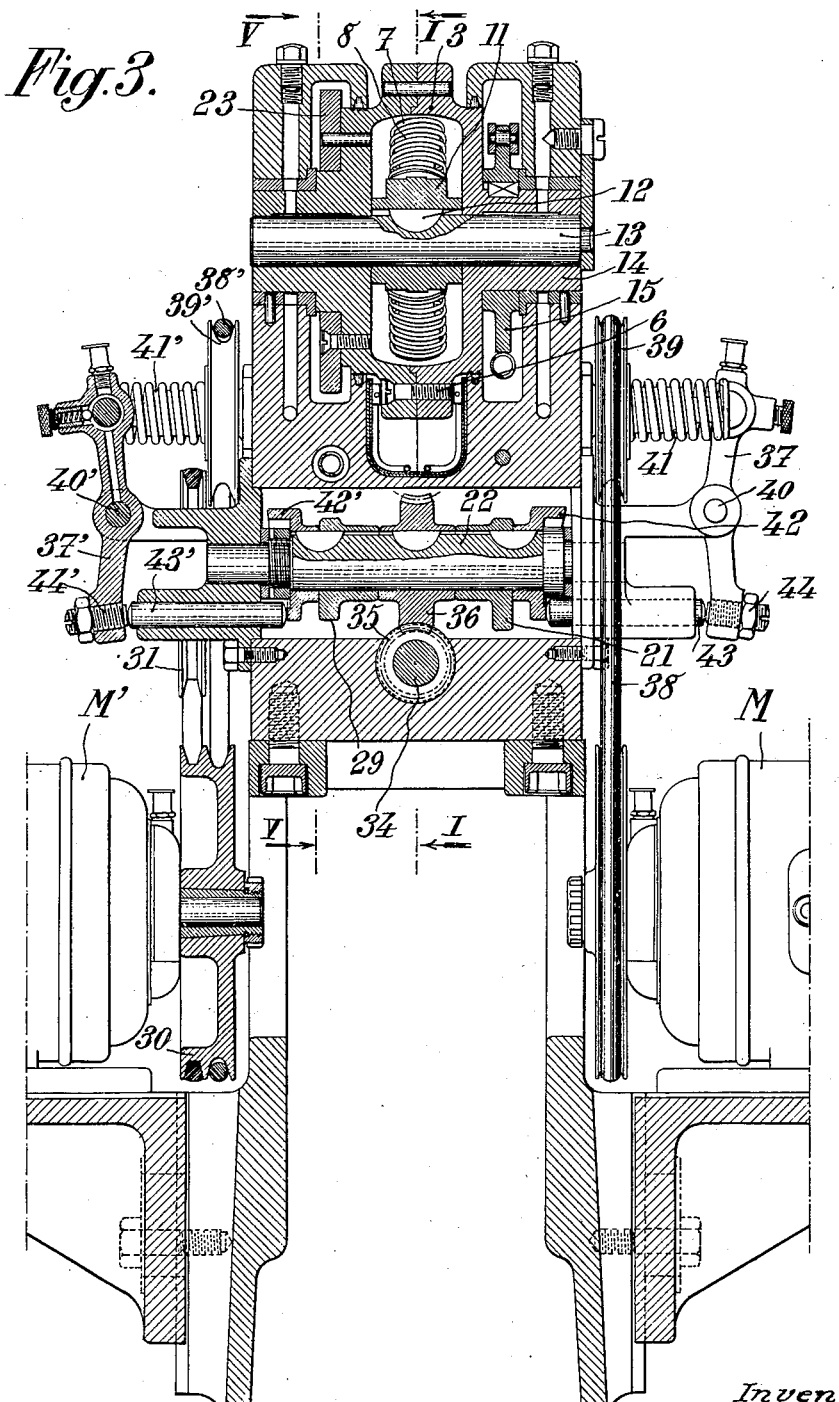

May 13, 1941.  M. BIRKIGT  2,242,170
MACHINE TOOL
Filed Dec. 28, 1938   4 Sheets-Sheet 3
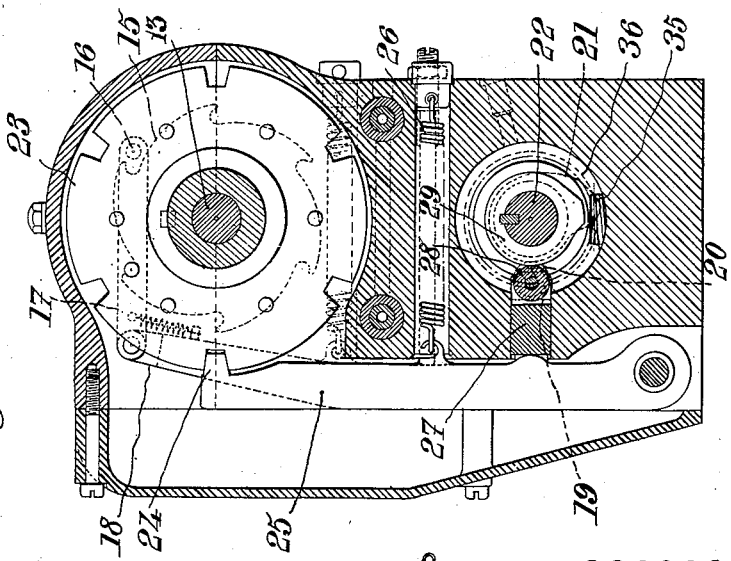
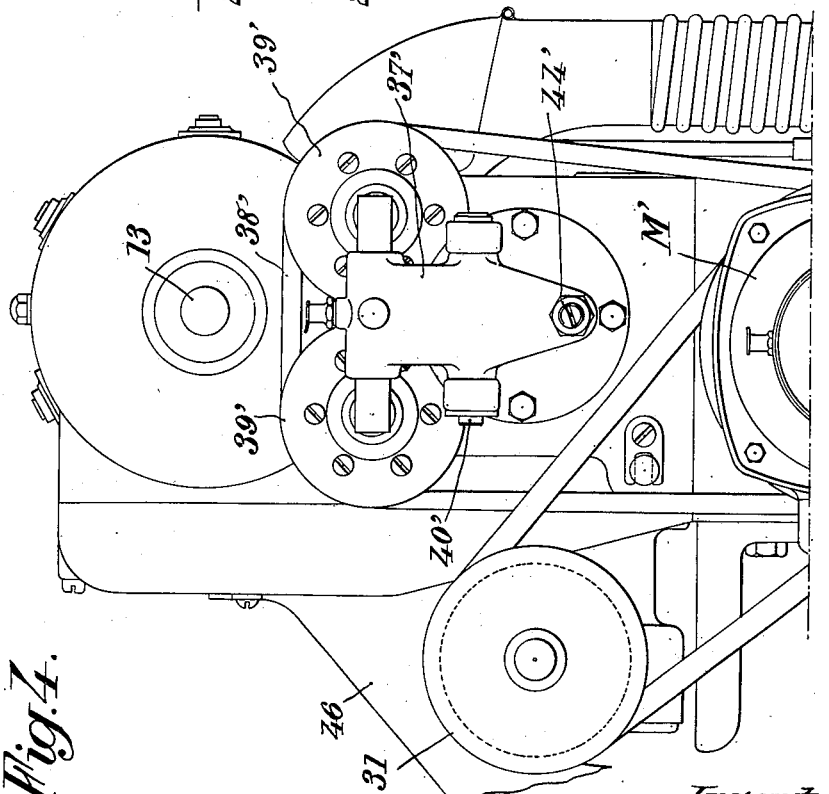
Inventor:
Marc Birkigt,
Bailey & Carson
Attorneys

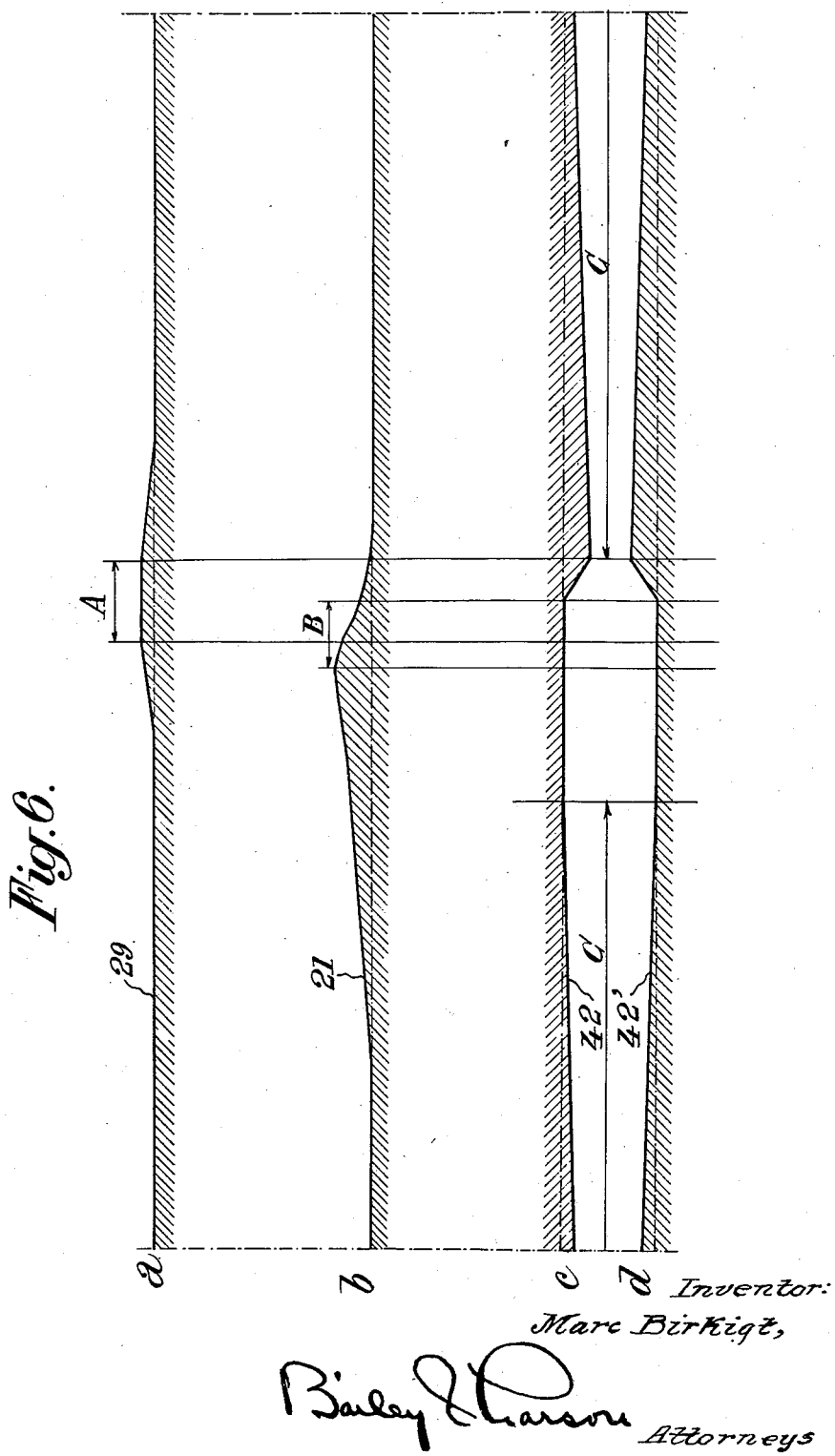

Patented May 13, 1941

2,242,170

UNITED STATES PATENT OFFICE 2,242,170

MACHINE TOOL

Marc Birkigt, Versoix, near Geneva, Switzerland

Application December 28, 1938, Serial No. 248,134
In Belgium May 19, 1938

8 Claims. (Cl. 77—21)

The present invention relates to machine-tools and it is more especially, although not exclusively, concerned, among said machines, those for the drilling of the bodies of shell fuzes.

The chief object of the present invention is to provide a machine of this kind which is better adapted to meet the requirements of practice than it had been possible up to this time, and in particular which permits of performing the desired operations with a greater accuracy.

The essential feature of the present invention consists, on the one hand, in supporting each of the pieces of work to be machined in a holder capable of sliding with respect to a suitable support, said holder being such that the piece of work it carries projects therefrom over at least a portion of the periphery thereof, and, on the other hand, in combining with said holding element control means such that said element is first wholly disengaged from its housing so as to permit the fitting of a piece of work therein, then partly withdrawn into its support when the machining operation is to take place, whereby said piece of work then comes to bear through its projecting periphery on said support, the relative position of the piece of work and of the support being thus made practically independent of the accuracy with which said piece of work has been fitted in its holding element.

Other features of the present invention will result from the following detailed description of some specific embodiments thereof.

Preferred embodiments of the present invention will be hereinafter described, with reference to the accompanying drawings, given merely by way of example, and in which:

Fig. 3 is a sectional view on the line III—III of Fig. 1;

Fig. 4 is an end view showing a part of the machine;

Fig. 5 is a sectional view on the line V—V of Fig. 3;

Fig. 6 is a diagram showing the development of four cams used in the machine.

Figure 2:
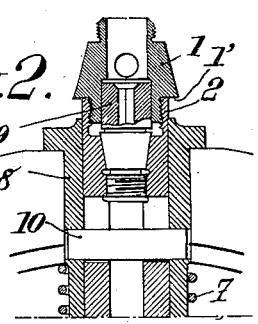
Fig. 2 is a detail view on an enlarged scale corresponding to Fig. 1.
Figure 1:
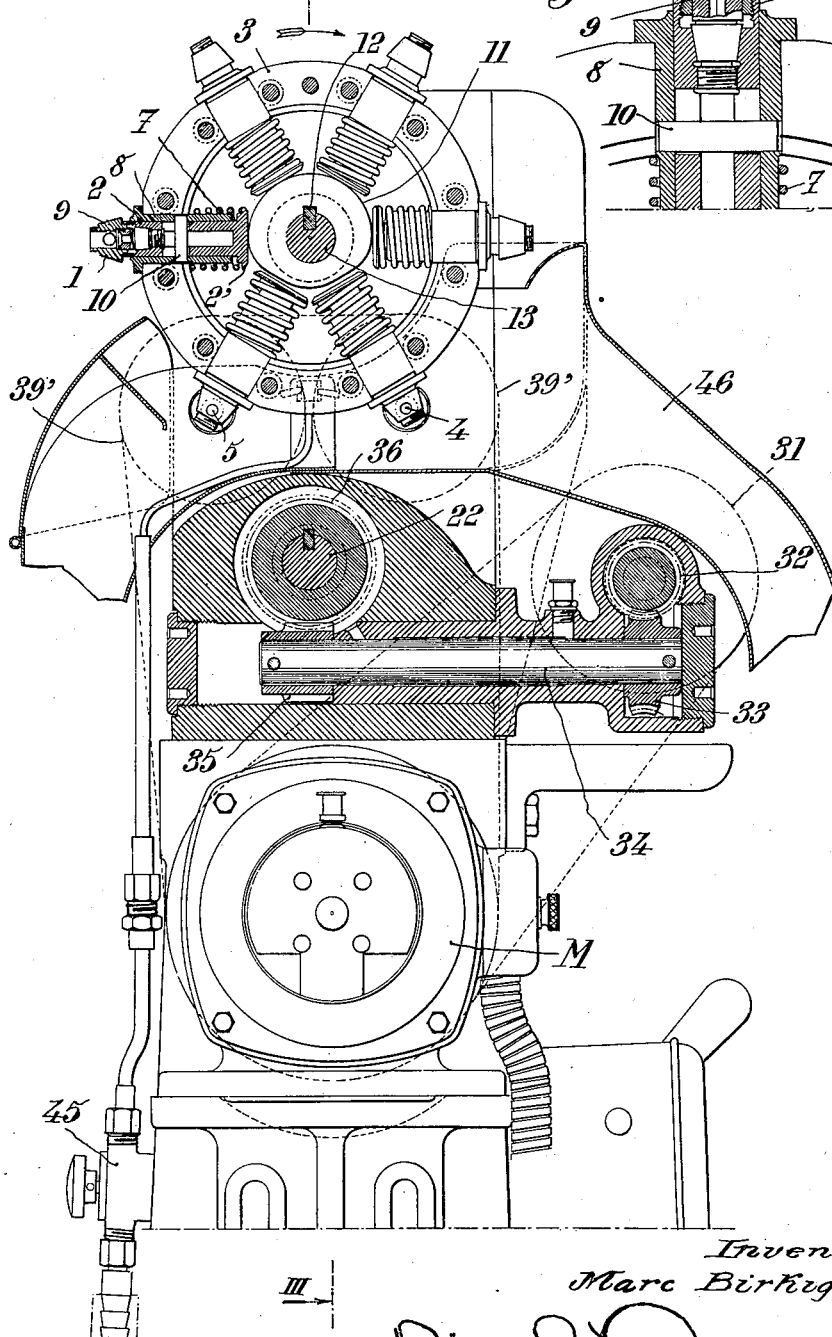
Fig. 1 shows, in elevation and in partial section on the line I—I of Fig. 3, a machine for drilling fuze bodies made according to an embodiment of the invention.

The machine which will now be described with reference to the drawings is for the drilling of fuze bodies.

According to the chief feature of the present invention, I provide, for carrying the fuze body to be machined, designated by reference character 1, at least one, and preferably several, body holding elements 2 adapted to move, for instance by sliding, with respect to a support 3, each of said body holding elements being such that the body it holds projects from said holding element over at least a portion of the periphery thereof.

These body holding elements are adapted to cooperate with control means such that each of said elements is first wholly disengaged from its housing so as to permit of adapting therein a fuze body 1, then partly withdrawn into support 3 when the drilling operation is to take place, in such manner that the fuze body then comes to bear against said support (or a piece rigid therewith) through its projecting part, consisting for instance of its collar or flange 1'.

It will be readily understood that, with such an arrangement, the relative position of the piece of work 1 to be machined and of support 3 (and consequently also the position of said piece of work with respect to the drilling tools) will be made practically independent of the accuracy with which said piece 1 has been adapted to the body holding element 2.

In particular, if the piece of work is fitted by screwing, as it will be supposed in the following description, the operator will not need screwing each piece 1 on the corresponding holding element always exactly with the same number of turns.

This is due to the fact that, in any case, whatever be the accuracy with which the operator has screwed body 1 in holder 2, when the latter is withdrawn into the support said body is applied exactly, through its projecting portion, against a part integral with support 3, whereby all the bodies 1 will be held in an identical relative position when entering the zone of action of the tools which are to perform the drilling operation. Such a mounting of the pieces to be machined therefore permits of combining the accuracy of machining with a large output of the machine, since the fitting of the pieces to be machined on the piece holding elements can be effected quickly and without requiring special precautions.

Although it is possible, taking into account the explanations above set forth, to provide many ways of making such a machine, it seems more particularly advantageous to have recourse, for practical purposes, to the embodiment which will now be described in detail, by way of example.

In this embodiment, it has been supposed that the drilling operations were made in two steps, to wit a first step corresponding to the roughing of the bore, and a second step corresponding to the finishing thereof. For this purpose, the machine is provided with two groups of tools (corresponding respectively to the two coaxial and diametrally opposed bores that are to be formed) located symmetrically on either side of the bodies to be drilled, each group including a roughing drill 4 and a finished drill 5, both actuated simultaneously.

On the other hand, in this embodiment of the invention, the support 3 is of the revolving type, that is to say constituted by an element such that the fuze bodies are brought into the zones of action of the drills through a discontinuous rotation movement of said support. Advantageously, as shown by the drawing, this support is constituted by two circular cheeks connected together by screws 6. With such an arrangement, the fuze bodies 1 are brought successively into the zones of action of the drills (first in the zone of action of the roughing drills and then in that of the finishing drills). Said piece holding elements 2 are arranged radially and slidably mounted, against the action of springs 7, in guides 8 rigid with said cheeks.

The embodiment of my invention illustrated by the drawings is made as follows:

Concerning the piece holders 2, their number is, for instance six and they are distributed over the periphery of support 3, with angular intervals of 60°.

Each of said piece holders is constituted by a cylindrical part provided with internal screw threads at one of its ends so as to permit of fitting a fuze body 1 by screwing, an axial tubular element 9 being preferably provided for facilitating the positioning of said fuze body.

I provide, at the other end of said piece holding element, a shoulder 2', which constitutes the head for a push piece and against which bears a return spring 7.

Advantageously, a pin 10 or the like extends across said elements so as to prevent them from turning when they should not.

In order to produce the sliding movements of said piece holding elements, I provide a stationary cam 11, for instance fixed by a pin 19 to a spindle 13, rigid with the frame 14 of the machine and acting as bearing for support 3.

This cam is of a shape such that the free end of each piece holding element 2 projects wholly from the corresponding guide 8 for a portion of the displacement of the support, during which said body or piece is outside of the zones of action of the drills (for instance for an angular displacement of 240°) said holding element being then partly withdrawn, so as to permit collar 1' to come, under the action of spring 7, into contact with the outer portion of said guide 8.

Concerning now the system which is to permit of imparting a discontinuous rotary movement to support 3, it is made in such manner that said support turns through an angle corresponding to one sixth of a circumference every time it is moved and is then stopped, in each of its positions, for a time sufficient for permitting of performing the drilling operations.

For this purpose, according to the embodiment shown by the drawings, on one side of support 3, I provide a ratchet wheel 15 (having six notches) which is adapted to be driven by a finger 16 carried by the end of an arm 17 acting as a pawl, said arm being itself carried by an oscillating lever 18 subjected to the action of return spring and of a push piece 19 advantageously controlled through the intermediate of a roller 20 by a cam 21 keyed on a shaft 22.

I further provide, on the other side of said support a divider plate 23 (having six notches) the notches of which are adapted to cooperate with a finger 24, preferably of frusto-conical shape, carried by an oscillating lever 25 subjected to the action of a return spring 26 and of a push piece 27 provided with a roller 28, said push piece being controlled by a cam 29 keyed on shaft 22 and the outline of which is such that finger 24 comes to stop plate 23 (and therefore also support 3) for the necessary period of time, after each rotation of one sixth of a revolution.

Shaft 22 is driven, for instance, by an electric motor M' coupled with said shaft through a speed reducing system which can be constituted, for instance, as follows: The end of the shaft of motor M' drives, through a double groove pulley 30, a pulley 31 adapted to rotate together with an endless screw 32 which itself meshes with a helical pinion 33. Said pinion 33 is keyed on a shaft 34 carrying an endless screw in mesh with a helical pinion 36, itself keyed on the shaft 22 to be driven.

I will now describe the arrangement of the drills and the means for driving them.

As already stated, these drills are grouped into two sets corresponding respectively to the two coaxial bores to be made in each piece 1. Two symmetrical levers 37 and 37' are provided, which control each a roughing drill 4 and a finishing drill 5. The drill holders of each group are rotated, respectively, by motor M8' and by a similar motor M. The drive is transmitted, for instance, through the intermediate of belts (38 for one of the groups and 38' for the other group) bearing each against two pulleys (39 for one group and 39' for the other), with respect to which the corresponding drill holders can move coaxially.

The levers 37 and 37' which control the drill holders are respectively pivoted about fixed axes 40 and 40' and they are adapted to cooperate, respectively, with return springs 41 and 41' which tend to produce the disengagement of said drills. These levers further cooperate with two cams 42 and 42' keyed on shaft 22 and which act on said holders, through push-pieces 43 and 43' which bear respectively on their sides. Therefore said cams respectively produce the simultaneous operation of the drills of each group of tools.

Advantageously, said push-pieces and the corresponding levers 37 and 37' are adapted to coact together through the intermediate of adjusting screws 44 or 44', which permit of varying the depth of drilling.

In the diagrams a, b, c, and d, I have shown the respective developments of cams 29, 21, 42 and 42'. These developed outlines are arranged one under the other in such manner as to indicate the relative positions of the cams, and, in particular, to show the period A for which the divider disc is free, the period B for which the support is caused to move forward, and the period C for which the drilling operation takes place.

Finally, this machine includes means for throwing into the zone of action of the drills a jet or blast of air in the compressed form, said blast being for instance regulated through a cock 45, the removal of the shavings taking place through a conduit 46.

The drilling machine for fuze bodies which has been described works in the following manner:

The ratchet wheel 16 permits the drive of support 3 by rotations of one sixth of a revolution so that the fuze bodies 1 are thus successively brought opposite the roughing drills 4 and the finishing drills 5. Before they enter the zone of action of these tools, the stationary cam 11 permits the pieces holders to be withdrawn, thus leaving said pieces to bear, through their collars 1', against their guide 8. In each of its working positions, support 3 is stopped by the action of finger 24 on the divider plate 23 and, under the action of cams 42 and 42' the two groups of two drills simultaneously perform their drilling stroke, then, under the action of springs 41 and 41', their disengagement stroke, after which support 3 again turns through one sixth of a turn, and the same cycle of operation again takes place.

In any case, whatever be the embodiment that is chosen, such an embodiment has considerable advantages, and in particular that of permitting of performing drilling operations with a high accuracy, while being easy to work and giving a high output, owing to the fact that the operator need not fit the fuze bodies 1 in their holding elements with a very high accuracy.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the accompanying claims.

What I claim is:

1. In a machine tool for machining a piece provided with a thread, the combination of a support and at least one tool movable with respect to each other, a piece holder movably mounted in said support and provided with a thread engageable with the thread on the piece, said holder being adapted to be partly disengaged from said support for insertion and removal of the piece into and out of said holder, the shape of said holder being such that the piece screwed therein can come into abutting contact with said support, and means for urging said holder toward the position thereof which brings said piece into contact with said support, for the operation of the said tool.

2. In a machine tool for drilling a piece provided with a thread, the combination of a support and a drilling tool rotatable with respect to each other about an axis, a plurality of piece holders radially mounted on said support each provided with a thread enageable with the thread on the piece and adapted to come successively opposite said drilling tool, each of said holders being slidable radially in said support so as to permit of partly disengaging it for insertion and removal of the piece into and out of said holder, the shape of each holder being such that the piece screwed therein can come into abutting contact with said support, means for rotating said support and said drilling tool with respect to each other about said axis so as to bring successively each of said holders opposite said drilling tool, and means for urging each holder toward the position thereof which brings the corresponding piece into contact with said support when said last mentioned holder is coming opposite said drilling tool.

3. In a machine tool for drilling a piece provided with a thread, the combination of a frame, at least one drilling tool carried by said frame so as to move axially along a fixed line, a revolving support journalled in said frame about an axis parallel to said line, a plurality of piece holders radially mounted on said support each provided with a thread engageable with the thread on the piece and adapted to come successively opposite said drilling tool, each of said supports being slidable radially in said support so as to permit of partly disengaging it in the outward direction for insertion and removal of the piece into and out from said holder, the shape of each holder being such that the piece screwed therein can come into abutting contact with said support, means for rotating said support about said axis so as to bring each of said holders successively opposite said drilling tool, a cam adapted to cooperate with all of said holders carried in fixed position by said frame, and elastic means for urging said holders toward said cam, the portion of said cam that corresponds to the holders located in the zone of action of said drilling tool being of such radius as to allow said last mentioned holders to slide inwardly, under the effect of said elastic means, toward the position for which the corresponding pieces are in contact with said support, and the portion of the cam that corresponds to the other holders including a portion of greater radius for outwardly disengaging said last mentioned holders from said support.

4. In a machine tool for drilling a piece provided with a thread, the combination of a support and a drilling tool movable with respect to each other, a plurality of piece holders movably mounted on said support each provided with a thread engageable with the thread on the piece and adapted to come successively opposite said drilling tool, each of said holders being adapted to be partly disengaged from said support, for insertion and removal of the piece into and out from said holder, the shape of each holder being cylindrical, with an outer diameter smaller than the outer diameter of the part of the piece that projects from said holder, so that said piece can come into direct contact with said support, means for moving said support and said drilling tool with respect to each other, and means for urging each holder toward the position thereof which brings the corresponding piece into contact with said support when said last mentioned holder is coming opposite said drilling tool.

5. In a machine tool for drilling a piece provided with a thread, the combination of a frame, at least one drilling tool carried by said frame so as to be movable axially along a fixed line, a revolving support journalled in said frame about an axis parallel to said line, a plurality of cylindrical piece holders radially mounted on said support each provided with a thread engageable with the thread on the piece and adapted to come successively opposite said drilling tool, each of said holders being slidable radially in said support so as to permit of partly disengaging it in the outward direction for insertion and removal of the piece into and out from said holder, the outer diameter of each holder being smaller than the outer diameter of the part of the corresponding piece external to said holder, whereby said piece can come into direct contact with said support, means for rotating said support about said axis so as to bring each of said holders successively opposite said drilling tools, a cam adapted to cooperate with all of said holders carried in fixed position by said frame, and means for elastically urging said holders against said cam, the portion of said cam that corresponds to the holders located in the zone of action of said drilling tool being of such radius as to allow said last mentioned holders to slide inwardly, under the effect of said elastic means, into the position for which the corresponding pieces are in contact with said support, and the portion of the cam that corresponds to the other holders including a portion of greater radius for outwardly disengaging said last mentioned holders from said support.

6. In a machine tool for drilling a piece provided with a thread, the combination of a frame, at least one drilling tool carried by said frame so as to be movable axially along a fixed line, a revolving support journalled in said frame about an axis parallel to said line, a plurality of piece holders radially mounted on said support each provided with a thread engageable with the thread on the piece and adapted to come successively opposite said drilling tool, each of said piece holders being slidable radially in said support so as to permit of partly disengaging it in the outward direction for insertion and removal of the piece into and out from said holder, the shape of each holder being such that the piece fitted therein can come into abutting contact with said support, means for rotating said support about said axis in a discontinuous manner so as to bring each of these holders successively opposite said drilling tools and to stop them for a time in said position, means, operatively connected with said driving means, for bringing said drilling tool into action during the time of stopping of said support, a cam adapted to cooperate with all of said holders, and elastic means for urging said holders toward said cam, the portion of said cam that corresponds to the holders located in the zone of action of said drilling tool being of such a radius as to allow said last mentioned holders to slide inwardly, under the effect of said elastic means, toward the position for which the corresponding pieces are in contact with said support, and the portion of said cam that corresponds to the other holders including a portion of greater radius for outwardly disengaging said last mentioned holders from said support.

7. Machine tool for machining pieces provided with threads comprising, in combination, a support, a piece holder for holding the piece to be machined and provided with a thread engageable with the thread on the piece, means movably mounting the piece holder in the support, a stopping surface rigid with said support and engageable by a piece mounted in said piece holder upon movement thereof with respect to said support, said stopping surface determining the position of the piece with respect to the support during machining, and control means for said piece holder for moving the piece holder to a position in which the piece cannot engage against said stopping surface, to permit insertion of the piece in the piece holder, and thereafter to move the piece holder until the piece engages said stopping surface.

8. Machine tool according to claim 7, in which said control means include elastic means acting on the piece holder to move it towards the position in which the piece engages said stopping surface, and means acting on the piece holder in opposition to the elastic means to move the piece holder to the position in which the piece is to be inserted in the piece holder.

MARC BIRKIGT.